United States Patent
Ansari et al.

(10) Patent No.: US 11,587,531 B2
(45) Date of Patent: Feb. 21, 2023

(54) TECHNOLOGIES FOR POWER EFFICIENT DISPLAY SYNCHRONIZATION

(71) Applicant: Intel Corporation, Santa Clara, CA (US)

(72) Inventors: Nausheen Ansari, Folsom, CA (US); Zhiming Zhuang, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 16/144,417

(22) Filed: Sep. 27, 2018

(65) Prior Publication Data
US 2019/0043451 A1    Feb. 7, 2019

(51) Int. Cl.
*G09G 5/12*     (2006.01)
*G06F 3/14*     (2006.01)
*G09G 5/00*     (2006.01)

(52) U.S. Cl.
CPC ............. *G09G 5/12* (2013.01); *G06F 3/1423* (2013.01); *G09G 5/006* (2013.01); *G06F 3/1438* (2013.01); *G09G 2330/02* (2013.01); *G09G 2330/021* (2013.01); *G09G 2330/023* (2013.01); *G09G 2340/0435* (2013.01)

(58) Field of Classification Search
CPC .... G09G 5/12; G09G 5/006; G09G 2330/021; G09G 2330/02; G09G 2330/023; G09G 2340/0435; G09G 2300/026; G06F 3/1423; G06F 3/1438
See application file for complete search history.

(56) References Cited

U.S. PATENT DOCUMENTS

| | | | |
|---|---|---|---|
| 2011/0043514 A1* | 2/2011 | Hussain | G09G 5/18 345/213 |
| 2013/0265294 A1* | 10/2013 | Kim | G09G 3/3611 345/214 |
| 2016/0180804 A1* | 6/2016 | Suzuki | G09G 5/006 345/520 |
| 2016/0239249 A1* | 8/2016 | Lee | G09G 5/12 |
| 2016/0358303 A1* | 12/2016 | Juliano | G09G 5/395 |
| 2019/0371271 A1* | 12/2019 | Morris | G06F 3/1438 |

OTHER PUBLICATIONS

U.S. Appl. No. 15/944,592, filed Apr. 3, 2018, by inventors Nobuyuki Suzuki, Zhiming Zhuang, Arvind S. Tomar, and Nausheen Ansari.
MIPI Alliance Specification for Display Serial Interface, Version 1.1, dated Nov. 22, 2011.

* cited by examiner

*Primary Examiner* — William Boddie
*Assistant Examiner* — Saifeldin E Elnafia
(74) *Attorney, Agent, or Firm* — Hanley, Flight & Zimmerman, LLC (57) ABSTRACT

Technologies for power efficient display synchronization are disclosed. A compute device may be connected to two display devices. The compute device may send image data to be displayed on each of the display devices in a burst mode, sending the image data in less time than the time between frames. The compute device may then enter a low-power state prior to sending the next image to the display devices. Before sending the next image to the display devices, the compute device may send a synchronization signal, which the display devices may use to synchronize the timing of displaying images between the two display devices.

19 Claims, 8 Drawing Sheets

TECHNOLOGIES FOR POWER EFFICIENT DISPLAY SYNCHRONIZATION

BACKGROUND

Compute devices that interface with two or more displays are becoming more common. Game systems, laptops, tablets, and embedded systems may have more than one display. Synchronizing the images on the displays can be done so that a clear image is presented to the user without artifacts.

However, presenting images on two displays can present some challenges. Image data may be streamed from a host to a particular display, allowing that display to update the image on the display as it receives the image data. Such an approach allows multiple displays to synchronize with each other based on the timing of the image data received.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
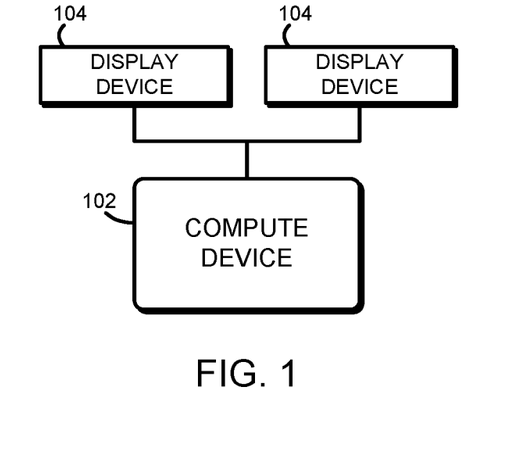
FIG. 1 is a simplified block diagram of a compute device controlling two display devices.

Referring now to FIG. 1, an illustrative compute device 102 includes or may be connected to two display devices 104. The compute device 102 may send images to each of the two display devices 104 to be displayed on the display devices 104 at a certain refresh rate, such as 60 Hertz (Hz). The illustrative compute device 102 may send the images to the display devices 104 in a burst mode, which allows for the image to be sent in less time than the time between frames. For example, the time between frames might be 16 milliseconds (ms), and the compute device 102 may send the images to the display device 104 in 5 ms. In the time between sending data in burst mode, the compute device 102 or portions of the compute device 102 may enter a low-power state, conserving energy. In order to allow for the two display devices 104 to remain synchronized, the compute device 102 may send a synchronization signal before sending each frame of images, such as a vertical synchronization packet.

Figure 2:
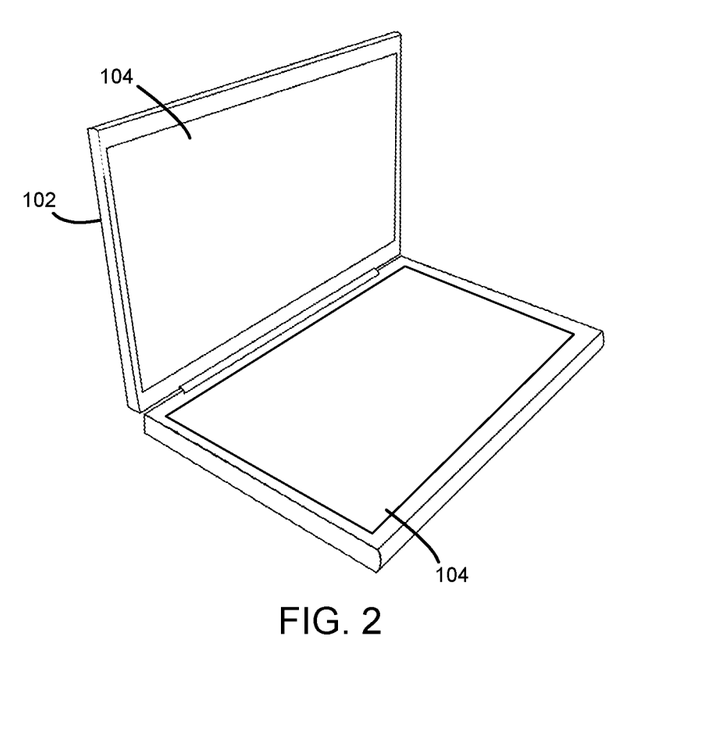
FIG. 2 is a simplified sketch of a foldable compute device with two display devices.

The compute device 102 and display devices 104 in FIG. 1 may be in any suitable configuration. For example, in some embodiments, the compute device 102 may be a cell phone or mobile computing device with two or more display devices 104, the compute device 102 may be an embedded system controlling two or more display devices 104, the display devices 104 may be embodied with multiple segments controlled by the compute device 102, etc. In some embodiments, the compute device 102 may be embodied as a foldable compute device with a foldable display device 104 implemented across each segment of the foldable compute device, as shown in FIG. 2.

Figure 3:
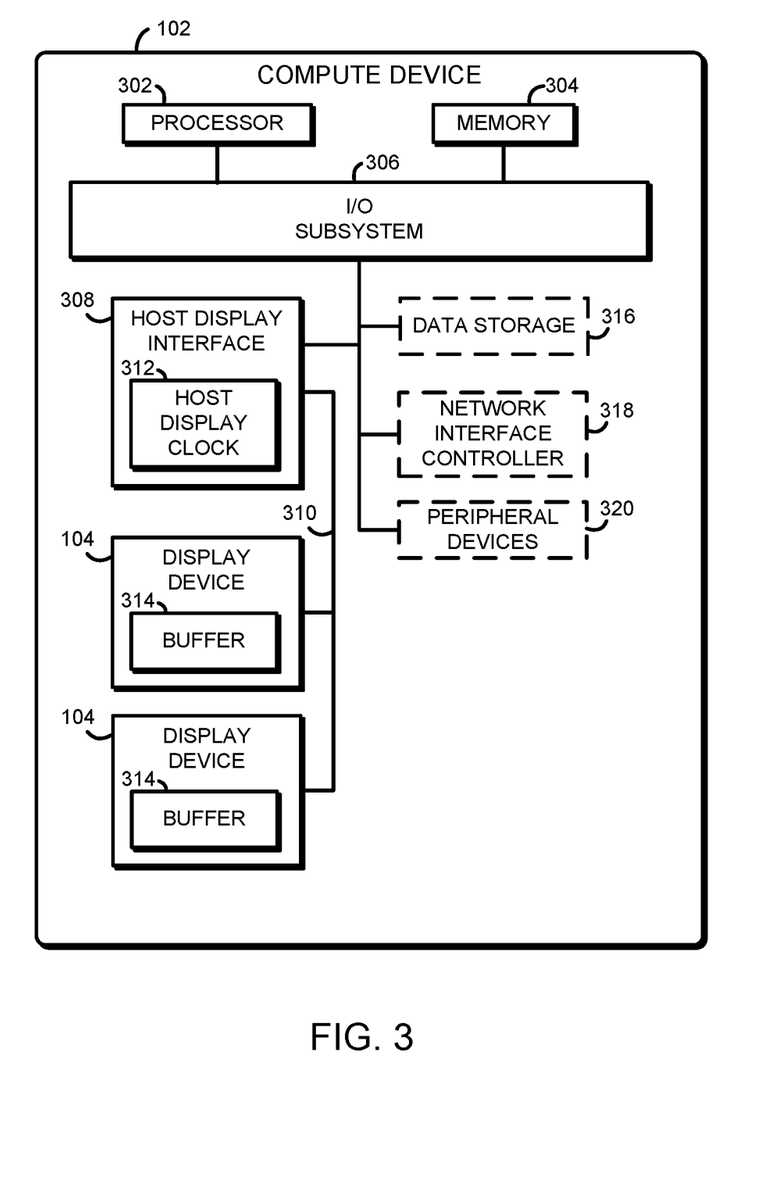
FIG. 3 is a simplified block diagram of a compute device with two display devices.

Referring now to FIG. 3, the compute device 102 may be embodied as any type of compute device capable of synchronizing images on the display devices 104 and performing the functions described herein. For example, the compute device 102 may be embodied as or otherwise be included in, without limitation, an embedded computing system, a server computer, a System-on-a-Chip (SoC), a multiprocessor system, a processor-based system, a consumer electronic device, a smartphone, a cellular phone, a desktop computer, a tablet computer, a notebook computer, a laptop computer, a network device, a networked computer, a wearable computer, a handset, a messaging device, a camera device, and/or any other computing device. The illustrative compute device 102 includes the processor 302, a memory 304, an input/output (I/O) subsystem 306, a host display interface 308, and two or more display devices 104. In some embodiments, one or more of the illustrative components of the compute device 102 may be incorporated in, or otherwise form a portion of, another component. For example, the memory 304, or portions thereof, may be incorporated in the processor 302 in some embodiments. In some embodiments, one, some, or all of the display devices 104 or portions thereof may form a part of or otherwise be incorporated into the compute device 102. Additionally or alternatively, one, some, or all of the display devices 104 or portions thereof may be separate from the compute device 102.

The processor 302 may be embodied as any type of processor capable of performing the functions described herein. For example, the processor 202 may be embodied as a single or multi-core processor(s), a single or multi-socket processor, a digital signal processor, a graphics processor, a microcontroller, or other processor or processing/controlling circuit. Similarly, the memory 304 may be embodied as any type of volatile or non-volatile memory or data storage capable of performing the functions described herein. In operation, the memory 304 may store various data and software used during operation of the compute device 102 such as operating systems, applications, programs, libraries, and drivers. The memory 304 is communicatively coupled to the processor 302 via the I/O subsystem 306, which may be embodied as circuitry and/or components to facilitate input/output operations with the processor 302, the memory 304, and other components of the compute device 102. For example, the I/O subsystem 306 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 306 may form a portion of a system-on-a-chip (SoC) and be incorporated, along with the processor 302, the memory 304, and other components of the compute device 102 on a single integrated circuit chip.

The host display interface 308 may embodied as any type of device, circuit, or other component that is configured to connect to the display devices 104. In some embodiments, some or all of the host display interface 308 may be integrated or otherwise form a part of another component of the compute device 102, such as the processor 302, the memory 304, the I/O subsystem 306, etc. In the illustrative embodiment, the host display interface 308 is configured to carry signals by one or more wires from the compute device 102 to the display devices 104 over an interconnect 310. The illustrative interconnect 310 may also carry a signal from the display devices 104 to the host display interface 308. The illustrative host display interface 308 sends images to each display device 104 over the interconnect 310, as discussed in more detail below in regard to FIG. 4.

The interconnect 310 may have separate components such as a bundle of wires for each display device 104. Additionally or alternatively, two or more of the display devices 104 may be connected to the same component or wire of the interconnect 310. In some embodiments, the interconnect 310 may be embodied as a wireless connection between the display devices 104 and other components of the compute device 102. The interconnect 310 may carry data at any suitable speed, such as more or less than 10 megabits per second (Mbps), 100 Mbps, 1 gigabit per second (Gbps), 3 Gbps, 10 Gbps, 30 Gbps, etc. The interconnect 310 may transmit data in serial or in parallel and may have more than one lane.

The host display interface 308 includes a host display clock 312. The host display interface 308 may use the host display clock 312 to send data on the interconnect 310 at a certain speed. The host display clock 312 may run at any suitable clock speed, such as any rate from 32 kilohertz (KHz) to 10 gigahertz (GHz). The host display clock 312 may be any suitable clock, such as a clock based on a phase-locked loop (PLL). In the illustrative embodiment, a clock signal is sent alongside a data signal on the interconnect 310, and the display devices 104 may use the clock signal to determine when to sample the data signal.

The display devices 104 may be embodied as any type of display on which information may be displayed to a user of the compute device 102, such as a touchscreen display, a liquid crystal display (LCD), an organic light emitting diode (OLED) display, a light emitting diode (LED) display, a cathode ray tube (CRT) display, a plasma display, an image projector (e.g., 2D or 3D), a laser projector, a heads-up display, and/or other display technology. The display device 104 may have more than one possible refresh rate, such as 24 Hz, 30 Hz, 60 Hz, or 120 Hz. The display device 104 may have any suitable resolution, such as 640×480, 800×600, 1024×768, 1280×1024, 1900×1200, 3840×2160, etc. In the illustrative embodiment, the display devices 104 may form a part of the compute device 102, such as an embedded display in a laptop. Additionally or alternatively, one, some, or all of the display devices 104 may be independent devices that can be disconnected from the compute device 102. The display device 104 includes a buffer 314, which may store one or more images to be displayed on the display device 104. In the illustrative embodiment, the display device 104 may receive an image at a rate faster than the image is displayed on the display device 104, and the display device 104 may store the image to be displayed in the buffer 314. The buffer 314 may be embodied as any suitable storage, such as DRAM, SRAM, NAND solid state storage, hard drive, etc. In some embodiments, the display device 104 may have additional components, such as circuitry to receive the image, process the image, perform the necessary movement of data, etc. The circuitry may be embodied as specialized circuitry such as an application specific integrated circuit or may be embodied as more general processing circuitry similar to the processor 302, the memory 304, the I/O subsystem 306, etc., a description of which is not included herein in the interest of clarity.

In some embodiments, the compute device 102 may include other or additional components, such as those commonly found in a compute device. For example, the compute device 102 may also have data storage 316, a network interface controller 318, and/or peripheral devices 320. The data storage 316 may be embodied as any type of device or devices configured for the short-term or long-term storage of data. For example, the data storage 316 may include any one or more memory devices and circuits, memory cards, hard disk drives, solid-state drives, or other data storage devices. The network interface controller 318 may be embodied as any type of interface capable of interfacing the compute device 102 with other compute devices. The network interface controller 318 may be configured to use any one or more communication technology and associated protocols (e.g., Ethernet, Bluetooth®, Wi-Fi®, WiMAX, near field communication (NFC), etc.). The peripheral devices 320 may include a keyboard, a mouse, etc.

Figure 4:
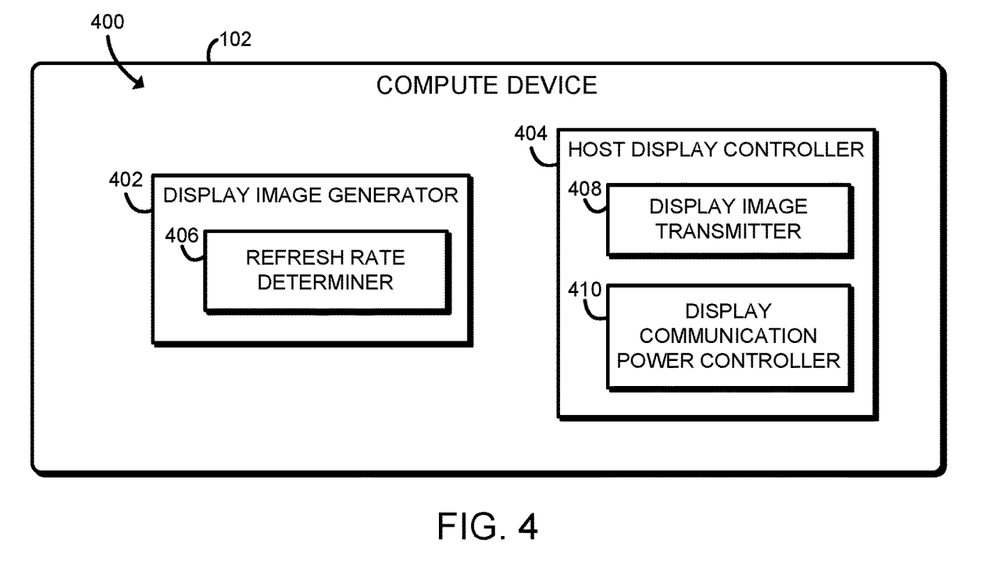
FIG. 4 is a block diagram of at least one embodiment of an environment that may be established by the compute device of FIG. 3.

Referring now to FIG. 4, in an illustrative embodiment, the compute device 102 establishes an environment 400 during operation. The illustrative environment 400 includes a display image generator 402 and a host display controller 404. The various components of the environment 400 may be embodied as hardware, software, firmware, or a combination thereof. For example, the various components of the environment 400 may form a portion of, or otherwise be established by, the processor 302 or other hardware components of the compute device 102 such as the host display interface 308. As such, in some embodiments, one or more of the components of the environment 400 may be embodied as circuitry or collection of electrical devices (e.g., display image generator circuitry 402, host display controller circuitry 404, etc.). It should be appreciated that, in such embodiments, one or more of the circuits (e.g., the display image generator circuitry 402, the host display controller circuitry 404, etc.) may form a portion of one or more of the processor 302, the memory 304, the I/O subsystem 306, the host display interface 308, the data storage 316, an application specific integrated circuit (ASIC), a programmable circuit such as a field-programmable gate array (FPGA), and/or other components of the compute device 102. For example, the display image generator circuitry 402 may be embodied as the processor 302 and associated instructions stored on the data storage 316 and/or the memory 304, which may be executed by the processor 302. Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the processor 302 or other components of the compute device 102. It should be appreciated that some of the functionality of one or more of the components of the environment 400 may require a hardware implementation, in which case embodiments of components which implement such functionality will be embodied at least partially as hardware.

The display image generator 402, which may be embodied as hardware (e.g., circuitry), firmware, software, virtualized hardware, emulated architecture, and/or a combination thereof as discussed above, is configured to generate images for display on the display devices 104. In the illustrative embodiment, an application, operating system, or other software on the compute device 102 may generate images for display on the display devices 104, which may include icons, windows, user interface elements, graphical elements, textual elements, etc. The display image generator 402 may generate one image to be displayed on each display device 104 so that the display devices 104 show the same image, or the display image generator 402 may generate a different image to be displayed on each display device 104 (e.g., a single image stretched across the display devices 104).

The display image generator 402 includes a refresh rate determiner 406. The refresh rate determiner 406 is configured to determine a refresh rate at which the display image generator 402 should generate frames for display on the display devices 104. In the illustrative embodiment, the refresh rate determiner 406 may receive an indication from each display device 104 indicating compatible refresh rates. The refresh rate determiner 406 may determine a refresh rate based on the compatible refresh rates of the display devices 104, such as the highest refresh rate supported by both display devices 104 or the lowest refresh rate supported by both display devices 104. In some embodiments, the refresh rate determiner 406 may determine that different refresh rates should be used for different display devices 104. In the illustrative embodiment, the display image generator 402 may not generate a new image for each frame in some circumstances, such as when the next image to be displayed on one or both of the display devices 104 has not changed from the current image displayed on one or both of the display devices 104.

The host display controller 404, which may be embodied as hardware, firmware, software, virtualized hardware, emulated architecture, and/or a combination thereof as discussed above, is configured to control the display devices 104 associated with the compute device 102. The host display controller 404 may send and receive configuration data or commands to and from the display devices 104. In the illustrative embodiment, a single host display controller 404 controls two display devices 104. However, a host display controller 404 may control one, two, or more than two display devices 104, and/or the compute device 102 may include more than one host display controller 404. Regardless, each illustrative host display controller 404 includes a display image transmitter 408 and a display communication power controller 410.

The display image transmitter 408 is configured to transmit images for display to the display devices 104. In the illustrative embodiment, the display image transmitter 408 may send an image for display in a burst mode, sending an image in less than the time between frames. For example, the time between frames might be 16 ms, and the display image transmitter 408 may send the images to the display device 104 in 5 ms. The display image transmitter 408 may send the images with any suitable technique or protocol, such as sending the data alongside a clock signal that the display device 104 can use to receive the signal. In some embodiments, the display image transmitter 408 may employ a variation of the Mobile Industry Processor Interface (MIPI) Digital Serial Interface (DSI). The display image transmitter 408 may send a synchronization signal to each display device 104 that the display device 104 can use as an indication for when to display the received images to synchronize the frame refresh of the display devices 102 in order to avoid or reduce tearing effects. For example, in the illustrative embodiment, the display image transmitter 408 may send a vertical synch start (VSS) packet indicating the beginning of a new frame and/or send a vertical synch end (VSE) packet indicating the end of a new frame. In some embodiments, the display image transmitter 408 may also send additional synchronization signals that indicate intra-frame timings, such as horizontal synch start (HSS) packets or horizontal synch end (HSE) packets. It should be appreciated that, in such embodiments, a display device 104 may not necessarily follow the indications of intra-frame timings and may present the image on the display device 104 based on timings determined by the display device 104. Although the illustrative embodiment uses a burst mode, in some embodiments, the display image transmitter 408 may be able to send the images to the display devices 104 at the same rate that the images are being displayed on the display devices 104.

In the illustrative embodiment, when there is no change in the image to be displayed on the display devices 104 as compared to the current image, the display image transmitter 408 may not send the same image again to the display devices 104. In such embodiments, the display image transmitter 408 may send an end-of-transmission signal to the display devices 104 indicating that an updated image will not be sent for the next frame and that the same image should be used. If the amount of time during which an image is not sent is past a threshold time, the display image transmitter 408 may send a clock synchronization ping that the display devices 104 can use for synchronization so that the timings of the two display devices 104 do not become out of synch. The threshold time may be any suitable time, such as 100 ms, 1 second, 1 minute, etc. When the display image transmitter 408 is to resume sending new images, the display image transmitter 408 may send a start-of-transmission signal to the display devices 104 to both notify them of an incoming image and to synchronize to the display image transmitter 408. The display image transmitter 408 may wait a certain amount of time after sending the start-of-transmission signal and before sending an image to be displayed. For example, when the display image transmitter 408 is to resume sending new images, the display image transmitter 408 may send a start-of-transmission signal, wait for a period equal to the time between frames at the lowest supported refresh rate, and then send a VSE and/or VSS packet. In some embodiments, the start-of-transmission signal may be a VSE packet.

The display communication power controller 410 is configured to manage the power usage of the host display controller 404. To do so, in some embodiments, the display communication power controller 410 is configured to turn off or reduce power to some or all of the host display controller 404 at certain times. For example, if the time between frames is 16 ms and the display image transmitter 408 sends an image to the display device 104 in 5 ms, the display communication power controller 410 may turn off or reduce power to the display image transmitter 408 for some or all of the 11 ms between when the transmission of the image has completed and when the transmission of the next image is scheduled to begin. In embodiments in which a clock signal is provided to the display devices 104, the display communication power controller 410 may turn off the clock signal to the display devices 104 during the time between transmission of the images. It should be appreciated that, in some embodiments, some or all of the other components of the compute device 102 such as the processor 302 may enter a low-power state as well.

Figure 5:
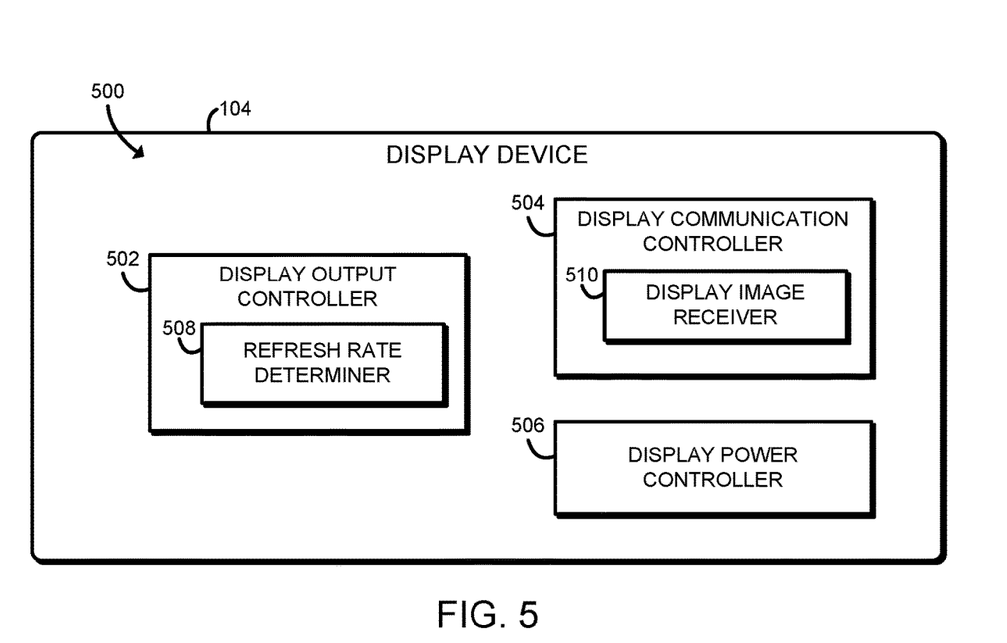
FIG. 5 is a block diagram of at least one embodiment of an environment that may be established by a display device.

Referring now to FIG. 5, in an illustrative embodiment, the display device 104 establishes an environment 500 during operation. The illustrative environment 500 includes a display output controller 502, a display communication controller 504, and a display power controller 506. The various components of the environment 500 may be embodied as hardware, software, firmware, or a combination thereof. As such, in some embodiments, one or more of the components of the environment 500 may be embodied as circuitry or collection of electrical devices (e.g., display output controller circuitry 502, display communication controller circuitry 504, display power controller circuitry 506, etc.). It should be appreciated that, in such embodiments, one or more of the circuits (e.g., the display output controller circuitry 502, the display communication controller circuitry 504, the display power controller circuitry 506, etc.) may form a portion of one a processor of the display device 104, memory of the display device 104, an application specific integrated circuit (ASIC), a programmable circuit such as a field-programmable gate array (FPGA), and/or other components of the display device 104. Additionally, in some embodiments, one or more of the illustrative components may form a portion of another component and/or one or more of the illustrative components may be independent of one another. It should be appreciated that some of the functionality of one or more of the components of the environment 500 may require a hardware implementation, in which case embodiments of components which implement such functionality will be embodied at least partially as hardware.

The display output controller 502, which may be embodied as hardware, firmware, software, and/or a combination thereof as discussed above, is configured to generate images for display on the display devices 104. The display output controller 502 is configured to control what is displayed on the display device 104. In the illustrative embodiment, the display output controller 502 may output an image to the display device 104 line by line, by outputting each line pixel by pixel. Additionally or alternatively, in some embodiments, the display output controller 502 may output several or all pixels at the same time. The particular manner in which an image is outputted will depend on the particular technology of the display. For example, in a CRT display, the display device 104 may scan an electron beam across each pixel. In an LCD display, the display device 104 may write a certain voltage level to a capacitor that is coupled to a liquid crystal, where the voltage level controls the amount of light that is output to the user from the liquid crystal.

In the illustrative embodiment, an image received by the display device 104 from the compute device 102 is stored in the buffer 314. The display output controller 502 may read data from the buffer 314 and output it on the display device 104. In the illustrative embodiment, the display output controller 502 may output the image on the display device 104 in an amount of time determined by the display device 104, and that time may be different than the time between frames. For example, the display device 104 may be operating at a refresh rate of 60 Hz for a period between frames of 16 ms, and may receive an image from the compute device 102 in 5 ms. If the display device 104 can operate at, e.g., 120 Hz, the display output controller 502 may output the image on the display device 104 in 8 ms. The display output controller 502 may then wait to display the next image on the display until it has received a synchronization signal from the compute device 102, such as a VSE packet or a VSS packet.

In some embodiments, the compute device 102 may not send a new image if the next image to be displayed is the same as the current image. The compute device 102 may signal the display device 104 that a new image will not be sent by sending an end-of-transmission signal to the display devices 104. In such a scenario, the display output controller 502 may refresh the image outputted on the display device 104 as necessary. For example, for a CRT display, the display output controller 502 may scan an electron beam over the output screen, rewriting the image. In an LCD display, the display output controller 502 may refresh the voltage values of the capacitors that control the amount of light visible to a user from a certain pixel. It should be appreciated that, in some embodiments, the rate of refreshing the same image on the display device 104 may occur at a different rate than the refresh rate, such as the lowest refresh rate supported by the display device 104. For example, in an LCD display, the voltage values of the capacitors may only need to be refreshed once a significant amount of charge has leaked from the capacitors. In some embodiments, if the amount of time during which an image is not sent is past a threshold time, the compute device 102 may send a clock synchronization ping that the display devices 104 can use for synchronization so that the timing of the display device 104 does not become out of synch with timing of the compute device 102. The threshold time may be any suitable time, such as 100 ms, 1 second, 1 minute, etc. When the compute device 102 is to resume sending new images, the compute device 102 may send a start-of-transmission signal to the display device 104 to both notify it of an incoming image and to allow the display device 104 to synchronize to the compute device 102. The compute device 102 may wait a certain amount of time after sending the synchronization signal and before sending an image to be displayed. For example, when the compute device 102 is to resume sending new images, the compute device 102 may send a start-of-transmission signal, wait for a period equal to the time between frames for the lowest supported refresh rate, and then send a VSE and/or VSS packet. In some embodiments, the start-of-transmission signal may be a VSE packet.

The display output controller 502 includes a refresh rate determiner 508. The refresh rate determiner 508 is configured to determine the supported refresh rates of the display device 104 and provide that information to the display communication controller 504 for communication to the compute device 102. The refresh rate determiner 508 is further configured to receive from the compute device 102 an indication of a refresh rate to be used by the display device 104.

The display communication controller 504, which may be embodied as hardware, firmware, software, and/or a combination thereof as discussed above, is configured to communicate with the compute device 102. The display communication controller 504 is configured to send and receive information related to the displaying of images on the display device 104, such as supported refresh rates of the display device 104, a particular refresh rate to use, configuration commands and parameters, etc.

The display communication controller 504 includes a display image receiver 510, which is configured to receive images from the compute device 102 for display on the display device 104. The display image receiver 510 may store the received images in the buffer 314.

The display power controller 506 is configured to control the power of the display device 104. To do so, in some embodiments, the display power controller 506 is configured to turn off or reduce power to some or all of the components of the display device 104 at certain times. For example, if the time between frames is 16 ms and the display communication controller 504 receives an image from the compute device 104 in 5 ms, the display power controller 506 may turn off or reduce power to the display communication controller 504 for some or all of the 11 ms between when the transmission of the image has completed and when the transmission of the next image is scheduled to begin. Similarly, if the display output controller 502 can update the output image on the display device 104 in 8 ms and the time between frames is 16 ms, the display power controller 506 may turn off or reduce power to some or all of the display output controller 502.

Figure 6:
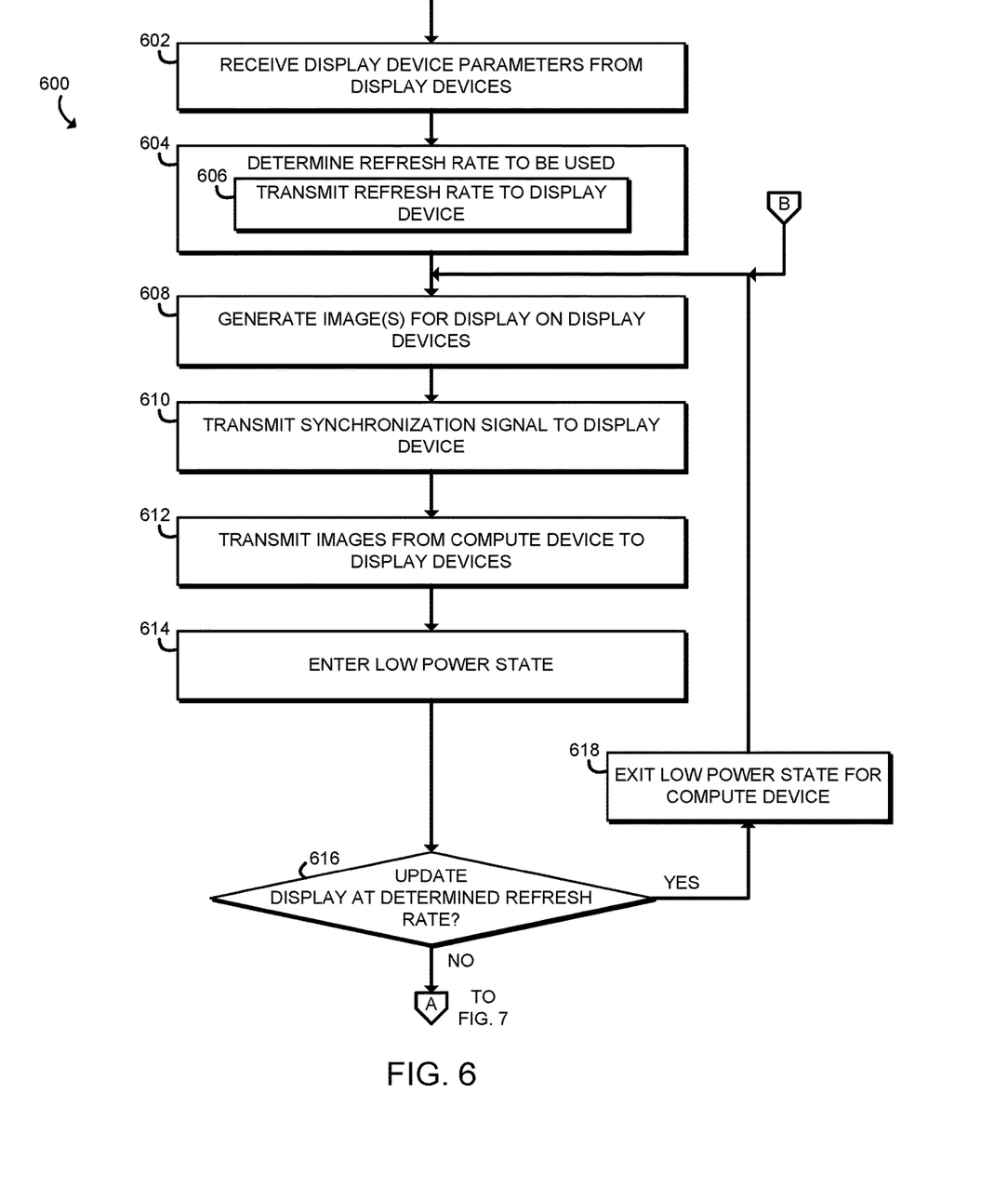
FIGS. 6 & 7 are a simplified flow diagram of at least one embodiment of a method for synchronization of sending images to display devices that may be executed by the compute device of FIGS. 3 and 4.

Referring now to FIG. 6, in use, the compute device 102 may execute a method 600 for display synchronization of display devices 104. The method 600 begins in block 602, in which the compute device 102 receives display device parameters from each of two or more display devices 104. The display device parameters may indicate various aspects of the display devices 104, such as resolution, type of display, and supported refresh rates.

In block 604, the compute device 102 determines a refresh rate to be used. The compute device 102 may determine the refresh rate based on various factors, such as the supported refresh rates of the display devices 104, user selection, etc. In some embodiments, the compute device 102 may select the lowest or highest refresh rate that both display devices 104 support. In block 606, the compute device 102 sends the selected refresh rate to the display devices 104.

In block 608, the compute device 102 generates one or more images for display on the display devices 104. In the illustrative embodiment, an application, operating system, or other software on the compute device 102 may generate images for display on the display devices 104. The images may include icons, windows, user interface elements, graphical elements, textual elements, etc. The compute device 102 may generate one image to be displayed on each display device 104 so that the display devices 104 show the same image, or the compute device 102 may generate a different image to be displayed on each display device 104.

In block 610, the compute device 102 sends a synchronization signal to each display device 104 that each display device 104 can use as an indication for when to display the received images. For example, in the illustrative embodiment, the compute device 102 may send a vertical synch start (VSS) packet indicating the beginning of a new frame and/or send a vertical synch end (VSE) packet indicating the end of the previous frame.

In block 612, the compute device 102 transmits the images to the display devices 104. In the illustrative embodiment, the compute device 102 may send an image for display in a burst mode, sending an image in less than the time between frames. For example, the time between frames might be 16 ms, and the compute device 102 may send the images to the display device 104 in 5 ms. The compute device 102 may send the images with any suitable technique or protocol, such sending the data alongside a clock signal that the display device 104 can use to receive the signal. In some embodiments, the compute device 102 may also send synchronization signals along with the image data that indicate intra-frame timings, such as horizontal synch start (HSS) packets or horizontal synch end (HSE) packets. It should be appreciated that, in such embodiments, a display device 104 may not necessarily follow the indications of intra-frame timings and may present the image on the display device 104 based on timings determined by the display device 104.

In block 614, the compute device 102 may enter a low power state after completing transmission of the most recent image to the display devices 104. For example, if the time between frames is 16 ms and the compute device 102 sends an image to the display device 104 in 5 ms, the compute device 102 may turn off or reduce power to portions of the compute device 102 related to rendering and/or sending images to the display devices 104 for some or all of the 11 ms between when the transmission of the image has completed and when the transmission of the next image is scheduled to begin. In some embodiments, the compute device 102 may provide a clock signal to the display devices 104 and may turn off the clock signal to the display devices 104 during the time between transmission of the images. It should be appreciated that, in some embodiments, some or all of the other components of the compute device 102 such as the processor 302 may enter a low-power state during this period as well.

In block 616, the compute device 102 determines whether to update the display at the determined refresh rate. If the compute device 102 is to update the display at the determined refresh rate, the method 600 proceeds to block 618, in which the compute device 102 exits from the low power state. The method 600 then proceeds to block 608 to generate another image for display on the display devices 104.

Figure 7:
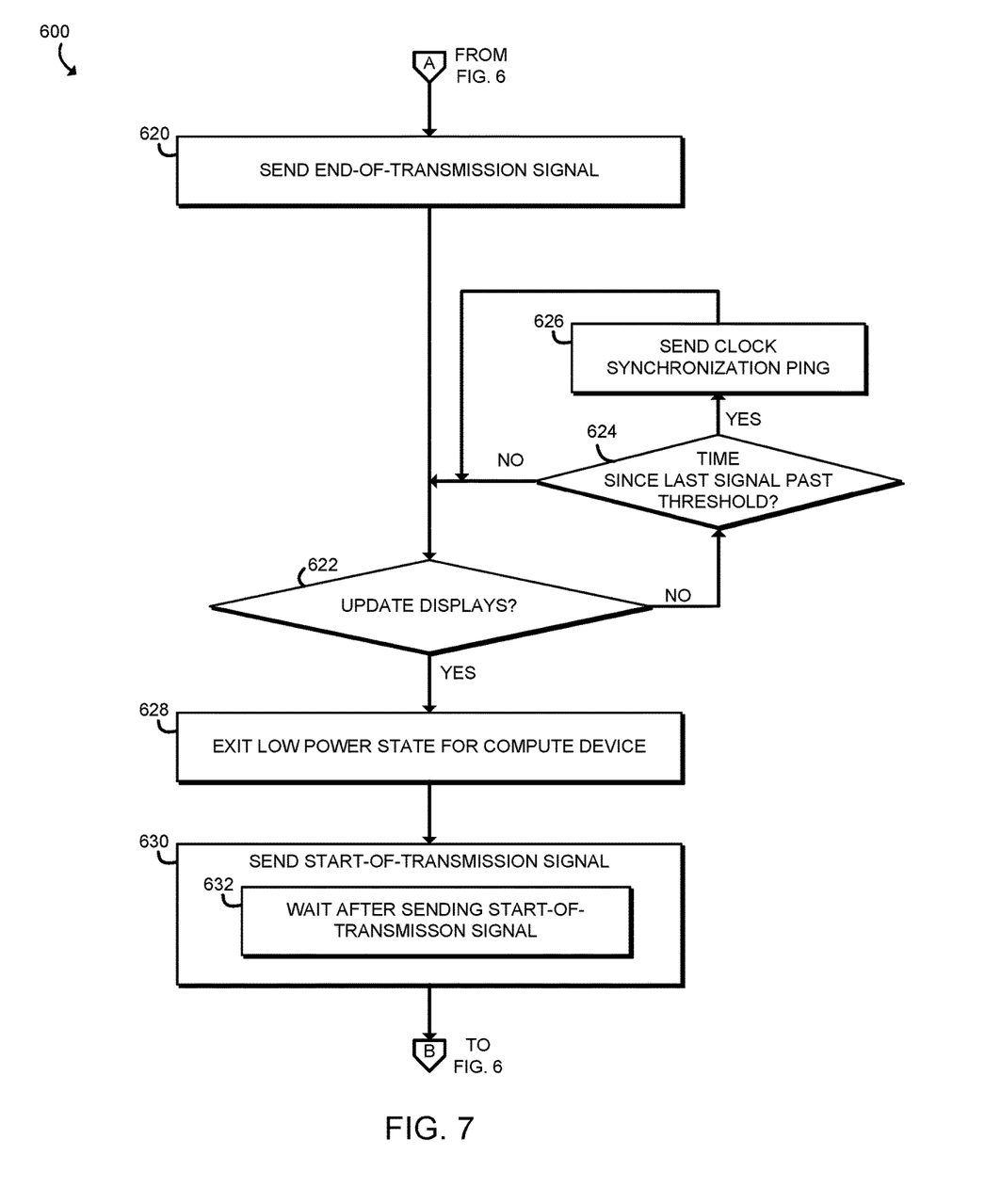

Referring back to block 616, if the compute device 102 determine not to update the display devices 104, such as when there is no change in the image to be displayed on the display devices 104 as compared to the current image, the method 600 proceeds to block 620 in FIG. 7. In block 620, the compute device 102 may send an end-of-transmission signal to the display devices 104, which indicates to the display devices 104 that an updated image will not be coming and that the display devices 104 should keep displaying the previous image.

In block 622, the compute device 102 determines whether to update the display devices 104, such as by determining that the image to be displayed on the display devices 104 should be updated. If not, the method 600 proceeds to block 624, in which the compute device 102 determines if the amount of time since the last signal was sent to the display devices 104 is past a threshold time. The threshold time may be any suitable time, such as 100 ms, 1 second, 1 minute, etc. If the amount of time is past the threshold, the method 600 proceeds to block 626, in which the compute device 102 sends a synchronization ping to the display devices 104 that the display devices 104 can use for synchronization so that the timings of the display devices 104 do not become out of synch. If the compute device 102 determines that the amount of time since the last signal is not past a threshold amount, the method 600 proceeds to block 622.

Referring back to block 622, if the compute device 102 determines to update the display devices 104, the method 600 proceeds to block 628, in which the compute device 102 exits the low power state. The compute device 102 then sends a start-of-transmission signal to each display device 104 in block 630. In some embodiments, the start-of-transmission signal may be a VSE packet. The compute device 102 may wait a certain amount of time after sending the start-of-transmission signal and before sending an image to be displayed in block 632. For example, after sending the start-of-transmission signal, the compute device 102 may wait for a period equal to the time between frames at the lowest supported refresh rate and then send a VSE and/or VSS packet. The method 600 then loops back to block 608 in FIG. 6.

Figure 8:
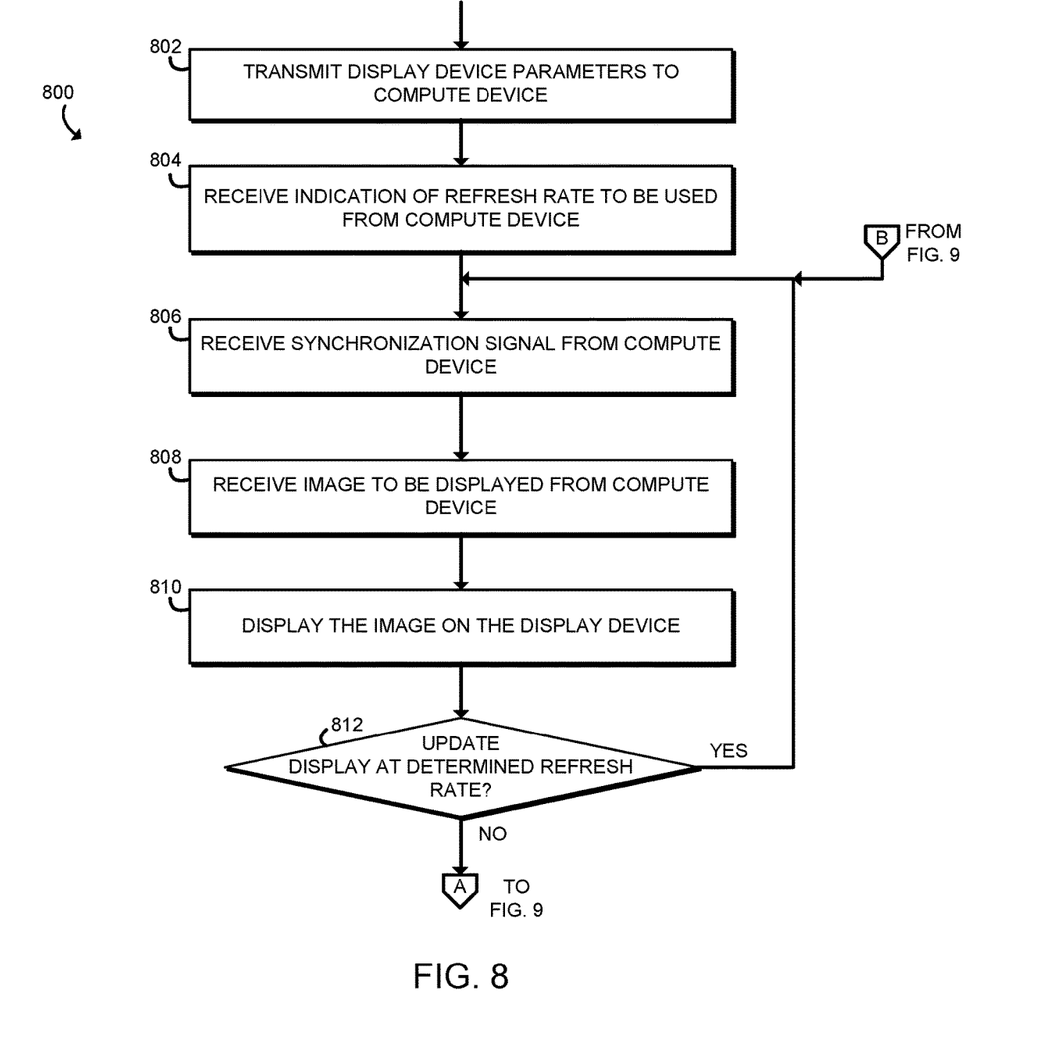
FIGS. 8 & 9 are a simplified flow diagram of at least one embodiment of a method for receiving images for display that may be executed by a display device.

Referring now to FIG. 8, in use, the display device 104 may execute a method 800 for display synchronization with a compute device 102. The method 800 begins in block 802, in which the display device 104 transmits display device parameters to the compute device 102. The display device parameters may indicate various aspects of the display devices 104, such as resolution, type of display, and supported refresh rates. In block 804, the display device 104 may receive an indication from the compute device 102 of the refresh rate to be used.

In block 806, the display device 104 receives a synchronization signal from the compute device 102 indicating the start of a new frame, which may be used to synchronize the frame refresh of the display devices 104 in order to avoid or reduce any tearing effects. For example, in the illustrative embodiment, the compute device 102 may send a vertical synch start (VSS) packet indicating the beginning of a new frame and/or send a vertical synch end (VSE) packet indicating the end of a new frame.

In block 808, the display device 104 receives the image to be displayed on the display device 104 from the compute device 102. In the illustrative embodiment, the display device 104 may receive an image from the compute device 102 in a burst mode, with the image sent in less than the time between frames. For example, the time between frames might be 16 ms, and the compute device 102 may send the images to the display device 104 in 5 ms. The display device 104 may store the received image in a buffer 314. The compute device 102 may send the images with any suitable technique or protocol, such sending the data alongside a clock signal that the display device 104 can use to receive the signal. In some embodiments, the compute device 102 may also send synchronization signals along with the image data that indicate intra-frame timings, such as horizontal synch start (HSS) packets or horizontal synch end (HSE) packets. It should be appreciated that, in such embodiments, the display device 104 may not necessarily follow the indications of intra-frame timings and may present the image on the display device 104 based on timings determined by the display device 104.

In block 810, the display device 104 displays the image on the display device 104. To do so, the display device 104 may access the image stored in the buffer 314. In the illustrative embodiment, the display device 104 may output an image to the display device 104 line by line, by outputting each line pixel by pixel. Additionally or alternatively, in some embodiments, the display device 104 may output several or all pixels at the same time. The particular manner in which an image is outputted will depend on the particular technology of the display. For example, in a CRT display, the display device 104 may scan an electron beam across each pixel. In an LCD display, the display device 104 may write a certain voltage level to a capacitor that is coupled to a liquid crystal, where the voltage level controls the amount of light that is output to the user from the liquid crystal.

In block 812, the display device 104 determines whether to update the display device 104 at the determined refresh rate. In some embodiments, the compute device 102 may not send a new image if the next image to be displayed is the same as the current image. The compute device 102 may signal the display device 104 that a new image will not be sent by sending an end-of-transmission signal to the display devices 104. If the display device 104 is to be updated at the determined refresh rate, then the method 800 loops back to block 806 to receive a synchronization signal from the compute device 104. If the display device 104 is not to be updated at the determined refresh rate, then the method 800 proceeds to block 814 in FIG. 9.

Figure 9:
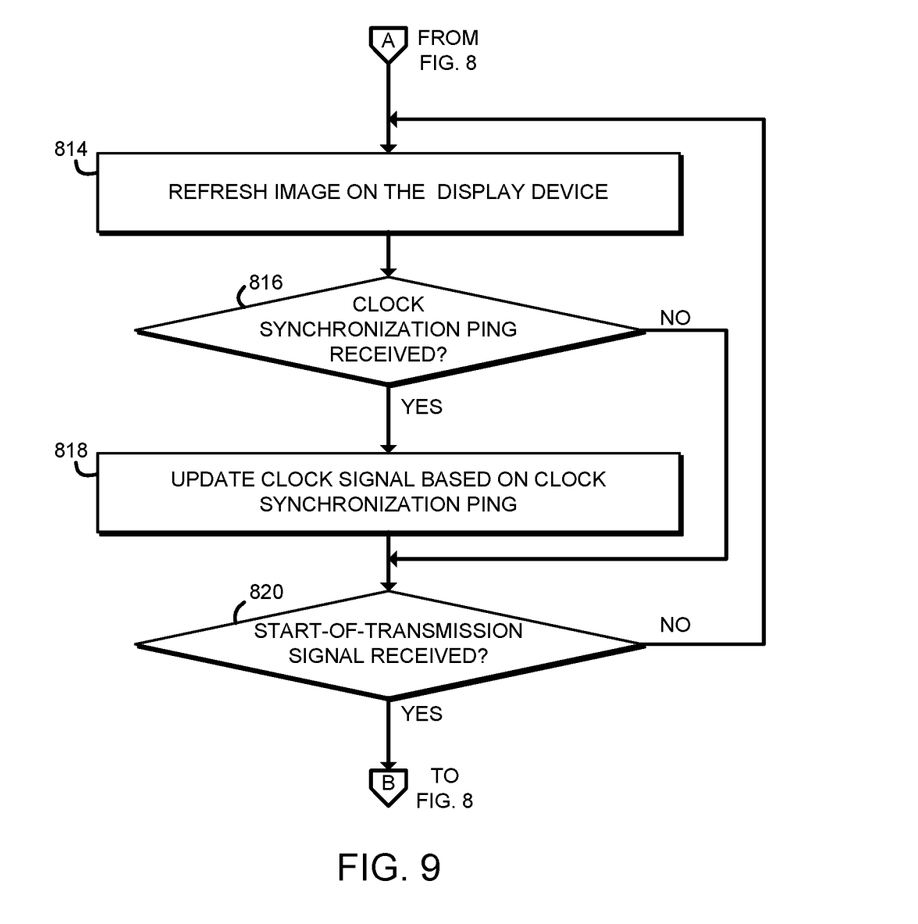

In block 814, the display device 104 refreshes the image on the display device 104. For example, for a CRT display, the display device 104 may scan an electron beam over the output screen, rewriting the image. In an LCD display, the display device 104 may refresh the voltage values of the capacitors that control the amount of light visible to a user from a certain pixel. It should be appreciated that, in some embodiments, the rate of refreshing the same image on the display device 104 may occur at a different rate than the determined refresh rate, such as the lowest refresh rate supported by the display device 104, which may conserve power.

In block 816, the display device 104 determines whether a clock synchronization ping has been received. The compute device 102 may send a clock synchronization ping so that, in cases where the image is not updated for a long period of time, the timings of the various display devices 104 do not drift too much. If a clock synchronization ping has not been received, the method 800 jumps to block 820, where the display device 104 determines whether a start-of-transmission signal has been received. If a clock synchronization ping has been received, the display device 104 updates a local clock signal of the display device 104 based on the clock synchronization ping in block 818.

In block 820, the display device 104 determines whether a start-of-transmission signal has been received. In some embodiments, a start-of-transmission signal may be a VSS or VSE packet. If a start-of-transmission signal has not been received, the method 800 proceeds back to block 814 to refresh the image on the display device 104. If a start-of-transmission signal has been received, the method 800 loops back to block 806, where the display device 104 receives a synchronization signal from the compute device 102. It should be appreciated that, in some embodiments, the display device 104 may receive a start-of-transmission signal shortly after beginning a refresh of the image on the display device 104. In such embodiments, the display device 104 may continue to refresh the image on the display device 104 at the lowest refresh rate, and the compute device 102 may wait for a period equal to the time between frames at the lowest refresh rate to send the next synchronization signal.

Figure 10:
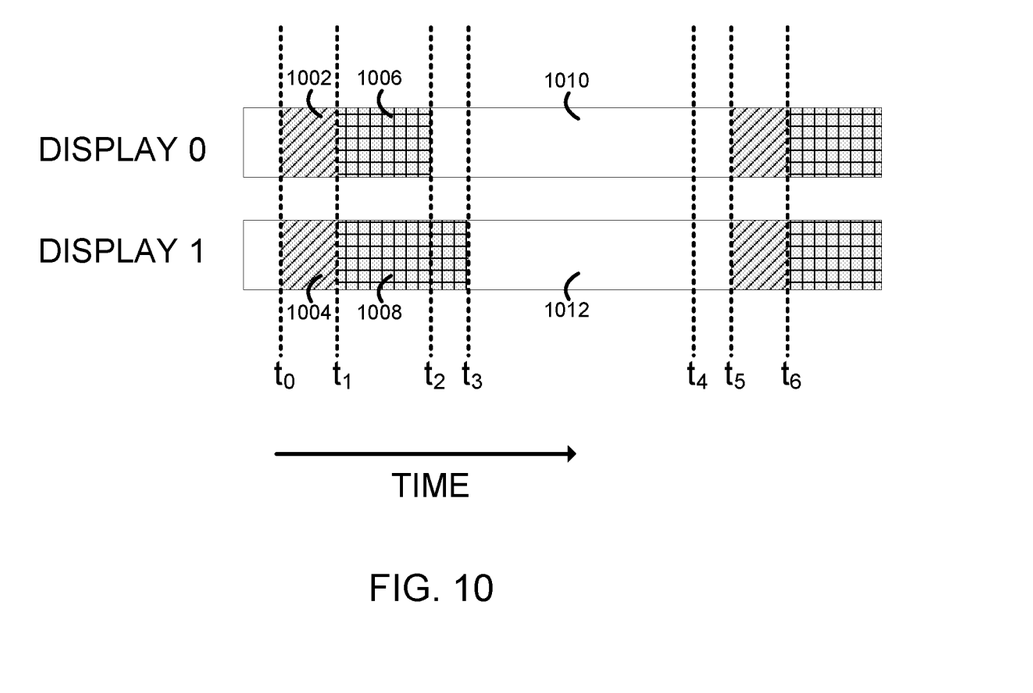
FIG. 10 is a simplified timing diagram of one embodiment of two display devices 104.

Referring now to FIG. 10, in one example embodiment, a timing diagram of two display devices 104, Display 0 and Display 1, is shown. At time $t_0$, each display device 104 receives a VSS packet and begins receiving image data in a burst mode. Although not shown in FIG. 10, it should be appreciated that, in some embodiments, there may be a gap between the VSS packet and the beginning on receiving data. Each display device 104 stores the image data in a buffer 314. Display 0 receives image data in time block 1002 between $t_0$ and $t_1$, and Display 1 receives image data in time block 1004, which is also between $t_0$ and $t_1$. At time $t_1$, the compute device 102 has completed transmission of the image. At this point, the compute device 102 may enter a low-power state because it does not need to communicate with the display device 104 at this time.

Display 0 outputs the image in time block 1006 between $t_0$ and $t_2$. Display 1 outputs the image in time block 1008 between $t_0$ and $t_3$. The timing of beginning the outputting of the image data is based on a signal received from the compute device 102, such as the VSS packet received at time $t_0$ or the VSE packet received shortly before $t_0$ (not shown). It should be appreciate each display device 104 may begin outputting the image on the display device 104 while still receiving the image from the compute device 102. It should further be appreciated that, because each display device 104 may be able to output the image data at different speeds due to the fact that the internal clock of these display devices 104 may not be actively synchronized, the two display devices 104 may not necessarily complete the output of the image data at the same time, as shown in FIG. 10.

After Display 0 has completed outputting the image, it may enter a low-power state in time block 1010 between $t_2$ and $t_4$. Similarly, after Display 1 has completed outputting the image, it may enter a low-power state in time block 1012 between $t_3$ and $t_4$. Each display device 104 receives either a VSE packet from the compute device 102 at time $t_4$ or a VSS packet from the compute device 102 at time $t_5$. It should be appreciated that, even though the two display devices 104 completed outputting the images at different times, they can become resynchronized by receiving the VSS and/or VSE packets. The compute device 102 may then send the next image in a burst mode between times $t_5$ and $t_6$, and the display devices 104 may output the next image in a similar manner as described above.

EXAMPLES

Illustrative examples of the devices, systems, and methods disclosed herein are provided below. An embodiment of the devices, systems, and methods may include any one or more, and any combination of, the examples described below.

Example 1 includes a display device for connection with a compute device, the display device comprising a display output controller to determine a refresh rate to be used by the display device, wherein the refresh rate indicates a time between frames of the display device; a display communication controller to receive a synchronization signal from the compute device; and receive an image to be displayed on the display device in less time than the time between frames, wherein the display output controller is further to display the image on the display device at a time based on the frame synchronization signal.

Example 2 includes the subject matter of Example 1, and wherein to display the image on the display device comprises to display the image on the display device in less time than the time between frames, further comprising a display power controller to place the display device in a low-power state in response to completion of display of the image on the display device.

Example 3 includes the subject matter of any of Examples 1 and 2, and wherein the display power controller is to maintain the display device in the low-power state for at least half of the time between the receipt of two consecutive frame synchronization signals.

Example 4 includes the subject matter of any of Examples 1-3, and wherein to receive the image to be displayed on the display device comprises to receive the image to be displayed on the display device based on a clock signal received from the compute device, wherein to display the image on the display device comprises to display the image on the display device based on a local clock signal different from the clock signal from the compute device.

Example 5 includes the subject matter of any of Examples 1-4, and wherein to display the image on the display device comprises to display the image on the display device in a time period that is independent of the determined refresh rate.

Example 6 includes the subject matter of any of Examples 1-5, and wherein the display communication controller is further to receive an end-of-transmission signal, wherein the display output controller is further to refresh the image on the display device in response to receipt of the end-of-transmission signal.

Example 7 includes the subject matter of any of Examples 1-6, and wherein the display communication controller is further to receive a clock synchronization signal after receipt of the end-of-transmission signal; wherein the display output controller is further to synchronize a local clock based on the clock synchronization signal.

Example 8 includes the subject matter of any of Examples 1-7, and wherein the display output controller is further to determine a lowest supported refresh rate of the display device, wherein to refresh the image on the display device comprises to refresh the image on the display device at the lowest supported refresh rate of the display device.

Example 9 includes a compute device for display synchronization, the compute device comprising a display image generator to determine a refresh rate to be used by each of at least two display devices, wherein the refresh rate indicates a time between frames of the at least two display devices; and generate, for each of the at least two display devices, an image for display on the corresponding display device; and a host display controller to transmit, to each of the at least two display devices, a frame synchronization signal; transmit, to each of the at least two display devices, the corresponding image in less time than the time between frames; and enter a low power state after transmission of the images to the at least two display devices.

Example 10 includes the subject matter of Example 9, and wherein the host display controller is further to remain in the low power state for at least half of the time between transmission of two consecutive frame synchronization signals.

Example 11 includes the subject matter of any of Examples 9 and 10, and wherein to enter the low power state comprises to turn off a clock signal provided from the compute device to the display device in response to completion of transmission of the images to the at least two display devices.

Example 12 includes the subject matter of any of Examples 9-11, and wherein the display image generator is further to determine whether to update the at least two display devices at the determined refresh rate, wherein the host display controller is further to transmit an end-of-transmission signal in response to a determination not to update the at least two display devices at the determined refresh rate.

Example 13 includes the subject matter of any of Examples 9-12, and wherein the host display controller is further to determine that a threshold amount of time has passed since the transmission of the end-of-transmission signal; and transmit, in response to the determination that the threshold amount of time has passed since the transmission of the end-of-transmission signal, a clock synchronization signal to each of the at least two display devices.

Example 14 includes the subject matter of any of Examples 9-13, and wherein the display image generator is further to determine, after transmission of the end-of-transmission signal, to update the at least two display devices, wherein the host display controller is further to transmit a start-of-transmission signal to each of the at least two display devices; determine the lowest supported refresh rate of the at least two display devices; wait, after transmission of the start-of-transmission signal, a time approximately equal to the time between frames at the lowest supported refresh rate of the at least two display devices; transmit, the wait of the time approximately equal to the time between frames at the lowest supported refresh rate of the at least two display devices, the frame synchronization signal to each of the at least two display devices.

Example 15 includes the subject matter of any of Examples 9-14, and further including a processor, wherein the compute device is on a system-on-a-chip with the processor.

Example 16 includes the subject matter of any of Examples 9-15, and further including the at least two displays.

Example 17 includes the subject matter of any of Examples 9-16, and wherein the at least two displays comprises three displays.

Example 18 includes a method for display synchronization by a compute device, the method comprising determining, by the compute device, a refresh rate to be used by each of at least two display devices, wherein the refresh rate indicates a time between frames of the at least two display devices; generating, by the compute device and for each of the at least two display devices, an image for display on the corresponding display device; transmitting, by the compute device and to each of the at least two display devices, a frame synchronization signal; transmitting, by the compute device and to each of the at least two display devices, the corresponding image in less time than the time between frames; and entering, by the compute device, a low power state after transmission of the images to the at least two display devices.

Example 19 includes the subject matter of Example 18, and further including receiving, by each of the at least two display devices, the corresponding image into a buffer in less time than the time between frames; displaying, by each of the at least two display devices, the corresponding image at a time based on the frame synchronization signal.

Example 20 includes the subject matter of any of Examples 18 and 19, and wherein the at least two display devices comprises a first display device and a second display device, wherein displaying, by each of the at least two display devices, the corresponding image comprises displaying, on the first display device, the corresponding image in a first period of time; displaying, on the second display device, the corresponding image in a second period of time different from the first.

Example 21 includes the subject matter of any of Examples 18-20, and further including remaining, by the compute device, in the low power state for at least half of the time between the transmission of two consecutive frame synchronization signals.

Example 22 includes the subject matter of any of Examples 18-21, and further including turning off, by the compute device, a clock signal provided from the compute device to the display device in response to completion of the transmission of the images.

Example 23 includes the subject matter of any of Examples 18-22, and further including determining, by the compute device, whether to update the at least two display devices at the determined refresh rate; transmitting, by the compute device, an end-of-transmission signal in response to a determination not to update the at least two display devices at the determined refresh rate; and refreshing, by each of the at least two display devices, the corresponding image on the corresponding display device in response to receipt of the end-of-transmission signal.

Example 24 includes the subject matter of any of Examples 18-23, and further including determining, by the compute device, that a threshold amount of time has passed since the transmission of the end-of-transmission signal; transmitting, by the compute device and in response to the determination that the threshold amount of time has passed since the transmission of the end-of-transmission signal, a clock synchronization signal to each of the at least two display devices; synchronizing, by each of the at least two display devices, a local clock based on the corresponding clock synchronization signal.

Example 25 includes the subject matter of any of Examples 18-24, and further including determining, by the compute device and after transmission of the end-of-transmission signal, to update the at least two display devices; transmitting, by the compute device, a start-of-transmission signal to each of the at least two display devices; determining, by the compute device, the lowest supported refresh rate of the at least two display devices; waiting, by the compute device and after transmission of the start-of-transmission signal, a time approximately equal to the time between frames at the lowest supported refresh rate of the at least two display devices; transmitting, by the compute device and after waiting the time approximately equal to the time between frames at the lowest supported refresh rate of the at least two display devices, the frame synchronization signal to each of the at least two display devices.

What is claimed is:

1. A compute device for display synchronization, the compute device comprising:
 a display image generator to:
  determine a refresh rate to be used by each of at least two display devices, wherein the refresh rate indicates a time between frames of the at least two display devices;
  generate, for each of the at least two display devices, an image for display; and
  determine whether to update the at least two display devices at the determined refresh rate; and
 a host display controller to:
  transmit, to each of the at least two display devices, a frame synchronization signal;
  transmit, to each of the at least two display devices, the image for display in less time than the time between frames;
  enter a low power state after transmission of the images to the at least two display devices;
  transmit an end-of-transmission signal to the at least two display devices to indicate the images transmitted to the at least two display devices will be used for at least a next frame;
  determine that a threshold amount of time has passed since the transmission of the end-of-transmission signal; and
  after the threshold amount of time has passed since the transmission of the end-of-transmission signal, transmit a clock synchronization signal to each of the at least two display devices during the low power state.

2. The compute device of claim 1, wherein the host display controller is further to remain in the low power state for at least half of the time between transmission of two consecutive frame synchronization signals.

3. The compute device of claim 1, wherein to enter the low power state, the host display controller is to turn off a clock signal provided from the compute device to one or more of the at least two display devices in response to completion of transmission of the images to the at least two display devices.

4. The compute device of claim 1, wherein the display image generator is further to determine, after transmission of the end-of-transmission signal, to update the at least two display devices,
 wherein the host display controller is further to:
  transmit a start-of-transmission signal to each of the at least two display devices;
  determine a lowest supported refresh rate of the at least two display devices;
  wait, after transmission of the start-of-transmission signal, a time approximately equal to the time between frames at the lowest supported refresh rate of the at least two display devices;
  transmit, the wait of the time approximately equal to the time between frames at the lowest supported refresh rate of the at least two display devices, the frame synchronization signal to each of the at least two display devices.

5. The compute device of claim 1, further including a processor, wherein the compute device is on a system-on-a-chip with the processor.

6. The compute device of claim 1, further including the at least two displays.

7. The compute device of claim 1, wherein the at least two displays includes three displays.

8. A method for display synchronization by a compute device, the method comprising:
 determining, by the compute device, a refresh rate to be used by each of at least two display devices, wherein the refresh rate indicates a time between frames of the at least two display devices;
 generating, by the compute device and for each of the at least two display devices, an image for display;
 determining, by the computing device, whether to update the at least two display devices at the determined refresh rate;
 transmitting, by the compute device and to each of the at least two display devices, a frame synchronization signal;
 transmitting, by the compute device and to each of the at least two display devices, the image for display in less time than the time between frames;
 entering, by the compute device, a low power state after transmission of the images to the at least two display devices;
 transmitting an end-of-transmission signal to indicate the images transmitted to the at least two display devices will be used for at least a next frame;
 determining that a threshold amount of time has passed since the transmission of the end-of-transmission signal; and
 after the threshold amount of time has passed since the transmission of the end-of-transmission signal, transmitting a clock synchronization signal to each of the at least two display devices during the low power state.

9. The method of claim 8, further including:
 accessing, by each of the at least two display devices, the image for display into a buffer in less time than the time between frames; and
 displaying, by each of the at least two display devices, the image for display at a time based on the frame synchronization signal.

10. The method of claim 9, wherein the at least two display devices includes a first display device and a second display device, wherein displaying, by each of the at least two display devices, the image for display includes:
 displaying, on the first display device, the image for display in a first period of time; and
 displaying, on the second display device, the image for display image in a second period of time different from the first period of time.

11. The method of claim 9, further including remaining, by the compute device, in the low power state for at least half of the time between a transmission of two consecutive frame synchronization signals.

12. The method of claim 9, further including turning off, by the compute device, a clock signal provided from the compute device to one or more of the at least two display devices in response to completion of the transmission of the images.

13. The method of claim 9, further including:
 refreshing, by each of the at least two display devices, the image for display in response to receipt of the end-of-transmission signal.

14. The method of claim 13, further including:
synchronizing, by each of the at least two display devices, a local clock based on the clock synchronization signal.

15. The method of claim 13, further including:
determining, by the compute device and after transmission of the end-of-transmission signal, to update the at least two display devices;
transmitting, by the compute device, a start-of-transmission signal to each of the at least two display devices;
determining, by the compute device, a lowest supported refresh rate of the at least two display devices;
waiting, by the compute device and after transmission of the start-of-transmission signal, a time approximately equal to the time between frames at the lowest supported refresh rate of the at least two display devices; and
transmitting, by the compute device and after waiting the time approximately equal to the time between frames at the lowest supported refresh rate of the at least two display devices, the frame synchronization signal to each of the at least two display devices.

16. An apparatus, comprising:
at least one memory;
display image generator instructions;
host display controller instructions;
processor circuitry including one or more of:
at least one of a central processing unit, a graphic processing unit or a digital signal processor, the processor circuitry to perform one or more first operations corresponding to instructions, the processor circuitry to execute the display image generator instructions and the host display controller instructions to:
  determine a refresh rate to be used by each of at least two display devices, wherein the refresh rate indicates a time between frames of the at least two display devices;
  generate, for each of the at least two display devices, an image for display; and
  determine whether to update the at least two display devices at the determined refresh rate; and
  transmit, to each of the at least two display devices, a frame synchronization signal;
  transmit, to each of the at least two display devices, the image for display in less time than the time between frames;
  enter a host display controller into a low power state after transmission of the images to the at least two display devices;
  transmit an end-of-transmission signal to the at least two display devices to indicate the images transmitted to the at least two display devices will be used for at least a next frame:
  determine that a threshold amount of time has passed since the transmission of the end-of-transmission signal; and
  after the threshold amount of time has passed since the transmission of the end-of-transmission signal, transmit a clock synchronization signal to each of the at least two display devices during the low power state.

17. The apparatus of claim 16, further including:
the processor circuitry to execute the host display controller instructions to:
  cause the host display controller to remain in the low power state for at least half of the time between transmission of two consecutive frame synchronization signals.

18. The apparatus of claim 16, further including the processor circuitry to execute the host display controller instructions to:
turn off a clock signal provided from the apparatus to one or more of the at least two display devices to enter the low power state in response to completion of transmission of the images to the at least two display devices.

19. The apparatus of claim 16, further including:
the processor circuitry to execute the display image generator instructions and the host display controller instructions to:
update the at least two display devices after transmission of the end-of-transmission signal;
transmit a start-of-transmission signal to each of the at least two display devices;
determine a lowest supported refresh rate of the at least two display devices;
wait, after transmission of the start-of-transmission signal, a time approximately equal to the time between frames at the lowest supported refresh rate of the at least two display devices;
transmit, the wait of the time approximately equal to the time between frames at the lowest supported refresh rate of the at least two display devices, the frame synchronization signal to each of the at least two display devices.

* * * * *